United States Patent
Maloof

(10) Patent No.: US 12,247,854 B2
(45) Date of Patent: *Mar. 11, 2025

(54) INDUCTIVE POSITION SENSOR

(71) Applicant: SENSATA TECHNOLOGIES, INC., Attleboro, MA (US)

(72) Inventor: James M. Maloof, Westwood, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/870,054

(22) Filed: Jul. 21, 2022

(65) Prior Publication Data

US 2024/0027233 A1    Jan. 25, 2024

(51) Int. Cl.
*G01D 5/20*    (2006.01)

(52) U.S. Cl.
CPC ................... *G01D 5/2073* (2013.01)

(58) Field of Classification Search
CPC .................................................. G01D 5/2073
See application file for complete search history.

(56) References Cited

U.S. PATENT DOCUMENTS

| | | | |
|---|---|---|---|
| 6,124,708 A | 9/2000 | Dames | |
| 10,866,121 B2 | 12/2020 | Utermoehlen et al. | |
| 11,047,710 B2 * | 6/2021 | Shao | H03K 17/97 |
| 11,125,584 B2 * | 9/2021 | Lee | G01D 5/2053 |
| 2020/0072643 A1 * | 3/2020 | Qama | G01D 5/2053 |
| 2022/0187335 A1 | 6/2022 | Shaga | |

FOREIGN PATENT DOCUMENTS

| | | |
|---|---|---|
| DE | 102021106510 A1 | 9/2021 |
| EP | 3642567 B1 | 1/2022 |
| WO | 2021150906 A1 | 7/2021 |

OTHER PUBLICATIONS

International Search Report and Written Opinion, PCT/US2023/023809, Aug. 1, 2023, 12 pages.

* cited by examiner

*Primary Examiner* — Walter L Lindsay, Jr.
*Assistant Examiner* — Milton Gonzalez
(74) *Attorney, Agent, or Firm* — Mark. H. Williams

(57) ABSTRACT

Methods and apparatuses to obtain increased performance and differentiation for an inductive position sensor through non-disruptive placement of multiloop coil interconnects are disclosed. In a particular embodiment, a sense element includes at least one transmit coil and a first receive coil that includes a first plurality of arrayed loops. In this embodiment, two or more of the first plurality of arrayed loops are phase blended. The sense element also includes a first plurality of interconnects. In this embodiment, each of the first plurality of interconnects connects two of the first plurality of arrayed loops. In this embodiment, the first plurality of interconnects is disposed outside of a sensing area of the sense element.

17 Claims, 12 Drawing Sheets

Provide A Sense Element Comprising: At Least One Transmit Coil; Two Or More Receive Coils Including: At Least A First Receive Coil That Includes A First Plurality Of Arrayed Loops, Wherein Two Or More Of The First Plurality Of Arrayed Loops Are Phase Blended; And A Second Receive Coil That Includes A Second Plurality Of Arrayed Loops, Wherein Two Or More Of The Second Plurality Of Arrayed Loops Are Phase Blended; A First Plurality Of Interconnects, Each Of The First Plurality Of Interconnects Connecting Two Of The First Plurality Of Arrayed Loops Of The First Receive Coil, Wherein The First Plurality Of Interconnects Is Disposed Outside Of A Sensing Area Of The Sense Element; And A Second Plurality Of Interconnects, Each Of The Second Plurality Of Interconnects Connecting Two Of The Second Plurality Of Arrayed Loops Of The Second Receive Coil, Wherein The Second Plurality Of Interconnects Is Disposed Outside Of The Sensing Area Of The Sense Element 510

↓

Drive A Transmission Signal To The At Least One Transmit Coil
520

↓

Detect A First Reference Signal In The First Receive Coil
530

↓

Detect A Second Reference Signal In The Second Receive Coil
540

↓

Determine A Position Of A Conductive Target In Proximity Of The Sense Element Based On A Change In The First Reference Signal And The Second Reference Signal
550

FIG. 5

INDUCTIVE POSITION SENSOR

BACKGROUND

Inductive position sensors provide feedback to the control systems for electric motors. For synchronous motors, this feedback is required in order to calculate the phase currents necessary to obtain the desired torque and achieve maximum motor efficiency.

Inductive position sensors operate on two core principles: induction of electromotive force (EMF) in a wire loop and induction of eddy currents in conductive materials. EMF is induced by changing the magnetic flux through a wire loop. This can be done by either changing the area of the loop within the magnetic field or by changing the strength of the field. Eddy currents are induced by either placing a conductor in a changing magnetic field or by relative motion between a conductor and a magnetic field.

Inductive position sensors may result in inaccurate readings when the signal strength in the sensing coil is weak or has a low signal to noise ratio. While multiple coil loops may be arrayed to produce a stronger signal, the placement of interconnects for these arrayed loops in the sensing area of a sense element can lead to a disruption of the sense element output.

SUMMARY

Embodiments in accordance with the present disclosure are directed to an inductive position sensor having phase blended, arrayed, multiloop inductive coils with loop interconnects disposed outside of the intended sensing area. The phase blended, arrayed, multiloop inductive coils increase signal strength on receive coils of an inductive position sensor and decrease the number of printed circuit board or printed film layers. By increasing the signal strength in the receive coils through multiple arrayed loops, the signal to noise ratio may be increased. Placement of the interconnects for the arrayed loops outside of the sensing area reduces disruptions in intended signal generation and reduces non-linearity in output. This also allows a higher density of coil traces to allow for use in smaller applications or to increase coil loops for increased signal strength. As such, the disclosed embodiments provide a combination of improved performance, increased design flexibility, and lower cost.

Embodiments in accordance with the present disclosure increase performance and differentiation for an inductive position sensor, such as those used in electric motor applications, through improvements to the sense element. For inductive position sensing, the basic operating principles are used by pairing a sensing element and a conductive target. Used in conjunction, the rotation of the target over the sensing elements provides output signals that can be captured with an application specific integrated circuit (ASIC) and provided to, for example, a vehicle electronic control unit (ECU).

An embodiment in accordance with the present disclosure is directed to a sense element for an inductive position sensor. The sense element includes at least one transmit coil and a first receive coil that includes a first plurality of arrayed loops, where two or more of the first plurality of arrayed loops are phase blended. The sense element also includes a first plurality of interconnects, each of the first plurality of interconnects connecting two of the first plurality of arrayed loops, where the first plurality of interconnects is disposed outside of a sensing area of the sense element.

Another embodiment in accordance with the present disclosure is directed to an inductive position sensor that includes a sense element including at least one transmit coil and two or more receive coils. The two or more receive coils include at least a first receive coil that includes a first plurality of arrayed loops, where two or more of the first plurality of arrayed loops are phase blended, and a second receive coil that includes a second plurality of arrayed loops, where two or more of the second plurality of arrayed loops are phase blended. The sense element also includes a first plurality of interconnects, each of the first plurality of interconnects connecting two of the first plurality of arrayed loops of the first receive coil, where the first plurality of interconnects is disposed outside of a sensing area of the sense element. The sense element further includes a second plurality of interconnects, each of the second plurality of interconnects connecting two of the second plurality of arrayed loops of the second receive coil, where the second plurality of interconnects is disposed outside of the sensing area of the sense element. The inductive position sensor also includes an integrated circuit configured to provide a transmission signal to the at least one transmit coil, detect a first reference signal in the first receive coil, detect a second reference signal in the second receive coil, and detect a position of a conductive target based on change in the first reference signal and the second reference signal.

Yet another embodiment in accordance with the present disclosure is directed to a method for an inductive position sensor. The method includes providing a sense element including at least one transmit coil and two or more receive coils. The two or more receive coils include at least a first receive coil that includes a first plurality of arrayed loops, where two or more of the first plurality of arrayed loops are phase blended, and a second receive coil that includes a second plurality of arrayed loops, where two or more of the second plurality of arrayed loops are phase blended. The sense element also includes a first plurality of interconnects, each of the first plurality of interconnects connecting two of the first plurality of arrayed loops of the first receive coil, where the first plurality of interconnects is disposed outside of a sensing area of the sense element. The sense element further includes a second plurality of interconnects, each of the second plurality of interconnects connecting two of the second plurality of arrayed loops of the second receive coil, where the second plurality of interconnects is disposed outside of the sensing area of the sense element. The method also includes driving, by an integrated circuit, a transmission signal to the at least one transmit coil. The method also includes detecting, by the integrated circuit, a first reference signal in the first receive coil. The method also includes detecting, by the integrated circuit, a second reference signal in the second receive coil. The method further includes determining, by the integrated circuit, a position of a conductive target in proximity of the sense element based on a change in the first reference signal and the second reference signal.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF DRAWINGS

FIG. 5 sets forth a flow chart illustrating an example method for an inductive position sensor in accordance with some embodiments of the present disclosure.

DETAILED DESCRIPTION

Figure 1:
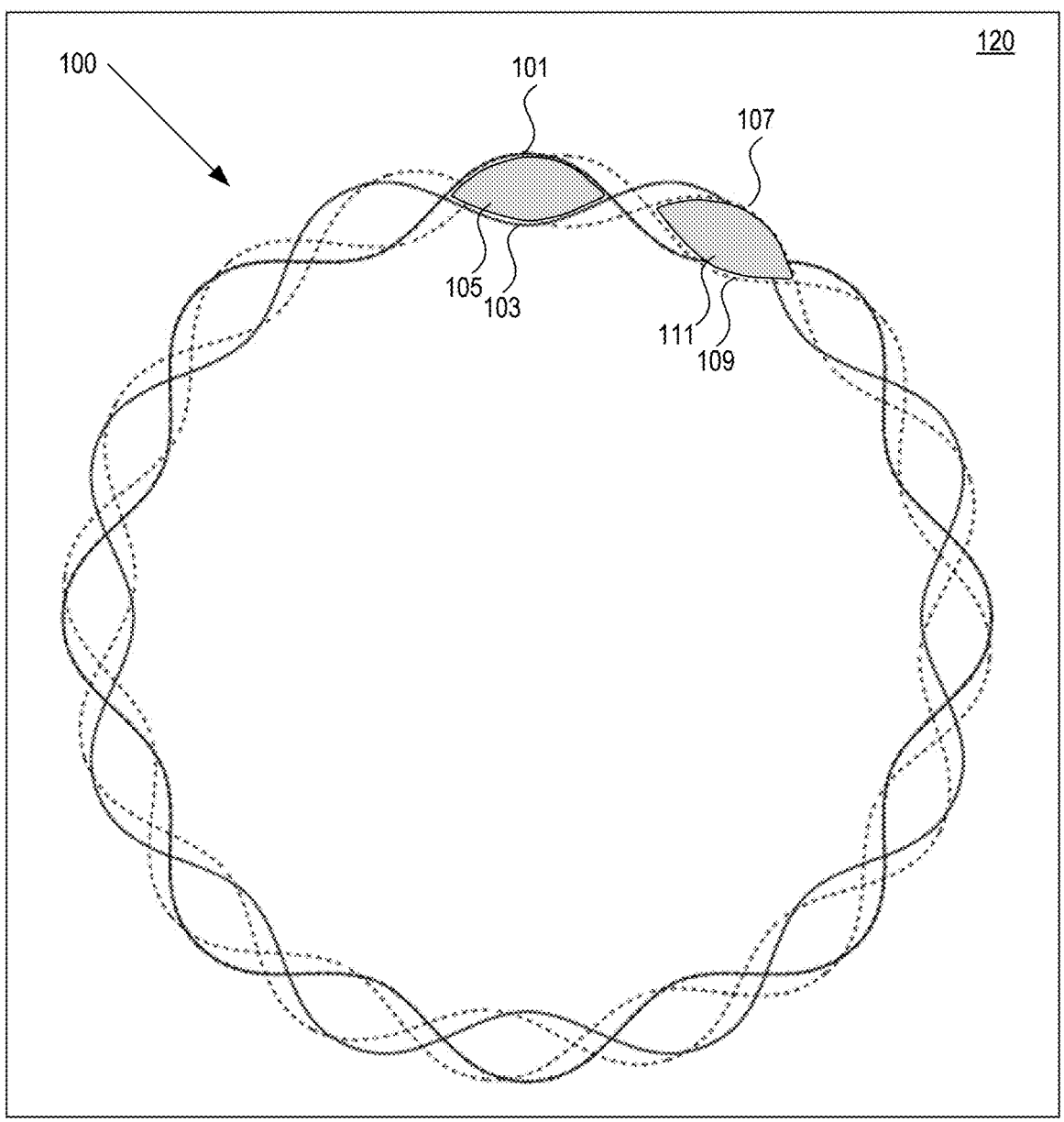
FIG. 1 illustrates an example coil layout of a single receive coil that is angularly arrayed in accordance with some embodiments of the present disclosure.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

In embodiments in accordance with the present disclosure, an inductive position sensor in a sensing element has output signals that are two phase shifted sinusoidal signals which allow for a ratio-metric measurement to track angular position by taking the arctan. The sensing element, which is directly connected to an integrated circuit (e.g., an application specific integrated circuit (ASIC)) includes a transmit coil and two or more receive coils. The transmit coil generates a magnetic field that is received by the receive coils. Driven by the integrated circuit, and in parallel with a capacitor, the transmit coil acts as a LC oscillator circuit. The LC oscillator generates a magnetic field that is the transmitted signal to the receive coils. The polarity of the magnetic field is determined by the direction of the current in the loop. The two receive coils are wire loops, connected to the integrated circuit, that exist within the oscillating magnetic field generated by the transmit coil. The field induces current flow in the coils and an EMF proportional to the area of the magnetic field within each of the wire loops. In alternative embodiments, the output of the sense element may be any number of sinusoidal analog outputs, or the output of the sense element may be a single digital angular (Theta) output.

In some embodiments, the design of each receive coil creates multiple wire loops in the coil that have opposing EMF generation. Without the target present, the summation of the EMF for a given receive coil is designed to be zero volts. This voltage signal is the input to the integrated circuit. Each coil is designed with a specified target to provide a sinusoidal change in voltage as the target moves from one point over the position sensor to another. In some embodiments, the target is a conductive material that interacts with the magnetic field generated by the transmit coil. When placed above the coil, the field induces eddy currents within the conductive target. The eddy currents then generate a second magnetic field which, according to Lenz's Law, opposes the initial magnetic field that interacted with the target. The result is an attenuated magnetic field in the area below (near) the target. The sensing element and the conductive target together generate a position signal. With the target present over a given wire loop, the attenuated magnetic field results in a change in the EMF generation for the effected loop. The delta is used to track the position of the target. To accomplish this, the two receive coils are identical and phase shifted by 90° (in the case of a different number of receive coils, the phase shift may be a different value, such as 60° for three receive coils). This results in a sine and a cosine output of which the arctan can be taken to calculate the position of the target.

In embodiments in accordance with the present disclosure, arrayed coil loops (e.g., phase blended, multiloop) may be implemented on either linear (X, Y, Z) or angular (θ, R, Z) sensors. When connected in series, receive coils arrayed in the Y (linear) dimension or the R (radial) dimension result in summed sinusoids that are phase aligned to generate a sinusoid of greater amplitude. Multiple coil loop sets that are offset in the Y (linear) dimension or the R (radial) dimension gain the benefit of each individual coil having greater field uniformity to provide a cleaner signal. Receive coil loop sets arrayed in the X (linear) dimension or the θ (angular)

dimension result in summed sinusoids that are phase blended to the mean position of each of the coils with a greater amplitude. Coils may be arrayed in the X or θ dimensions by a full electrical period, however the phase blended coils are arrayed by less than a full electrical cycle with the optimal phase separation values being dependent on the number of receive coils and signal transform method (i.e., 2 or 3 phase sinusoids). In various embodiments, angular sensors may be implemented as 360° sensors or arc sensors. As used herein, "phase blended" may refer to angularly arrayed coil loop sets in 360° sensors or arc sensors, or X-arrayed coil loop sets in a linear sensor. As used herein, "amplitude arrayed" may refer to radially arrayed coil loop sets in 360° sensors or arc sensors, or Y-arrayed coil loop sets in a linear sensor.

Exemplary apparatuses and methods for an inductive position sensor in accordance with the present disclosure are described with reference to the accompanying drawings, beginning with FIG. 1. FIG. 1 illustrates an example coil layout of a single receive coil 100 of position sensor that is angularly arrayed (i.e., θ arrayed) in accordance with the present disclosure. In the example of FIG. 1, the receive coil 100 includes a first set of sinusoidal loops having a first sinusoidal trace pattern 101 (e.g., a sine wave) and a second sinusoidal trace pattern 103 that is the reflection of the first sinusoidal trace pattern 101. In some embodiments, sinusoidal trace patterns 101, 103 are formed on same plane (i.e., conductive layer) or different planes of a sense element 120 (e.g., a multilayered PCB or printed film structure). In some embodiments, portions of each sinusoidal trace pattern 101, 103 are formed on one plane while other portions of each sinusoidal trace patterns 101, 103 are formed on a different plane. The sinusoidal trace patterns 101, 103 define coil loops surrounding an intended sensing areas 105 for detecting a magnetic field attenuated by the target when the target is over an intended sensing area 105. When the target is present over the intended sensing area 105, the attenuated magnetic field creates a change in the EMF generation of the affected loop, which is detectable from the signal on the sinusoidal trace patterns 101, 103.

In the example of FIG. 1, the receive coil 100 also includes a second set of sinusoidal loops having a first phase-shifted sinusoidal trace pattern 107 and a second phase-shifted sinusoidal trace pattern 109 that is the reflection of the first phase-shifted sinusoidal trace pattern 107, where the phase-shifted sinusoidal trace patterns 107, 109 are phase-shifted relative to the sinusoidal trace patterns 101, 103. In some embodiments, phase-shifted sinusoidal trace patterns 107, 109 are formed on the same plane (i.e., conductive layer) or different planes of the sense element 120. In some embodiments, portions of each phase-shifted sinusoidal trace pattern 107, 109 are formed on one plane while other portions of each phase-shifted sinusoidal trace patterns 107, 109 are formed on a different plane. The sinusoidal trace patterns 107, 109 define coil loops surrounding an intended sensing area 111 for detecting a magnetic field attenuated by the target when the target is over the intended sensing area 111. When the target is present over the intended sensing area 111, the attenuated magnetic field creates a change in the EMF generation of the affected loop, which is detectable from the signal on the sinusoidal trace patterns 107, 109. By summing the measured EMF generation in the intended sensing areas 105, 111 and correlating the summed measurement to a mean position of the intended sensing areas, an enhanced position signal for the location of the target with respect to the sense element 120 is generated. The enhanced position signal has double the amplitude of a signal derived from a single sense area.

In various embodiments, an inductive sense element for an inductive position sensor includes one or more receive coils corresponding to one or more signals. For example, in some embodiments, an inductive position sensor includes a dual coil pattern having two receive coils corresponding to distinct signal patterns that are angularly arrayed (e.g., sine and cosine). Each receive coil pattern for each signal may further include multiple angularly arrayed loops having both positive and negative windings. In some examples, the angularly arrayed loops (i.e., phase windings) of the receive coils are formed by sinusoidal trace patterns on or in a printed circuit board (PCB) or printed film structure. In some embodiments, as will be explained in more detail below, portions of each sinusoidal trace pattern in each coil are formed on one plane while other portions of that sinusoidal trace pattern are formed on a different plane, such as top and bottom layers of a PCB or various layers of a multilayer PCB. In some examples, as will be explained in more detail below, an inner ring of vias and an outer ring of vias allow a signal to propagate between layers from a trace on one layer to a trace on another layer. Additionally, vias are used for crossover interconnects between positive and negative windings, and for crossover interconnects between phase windings.

Figure 2A:
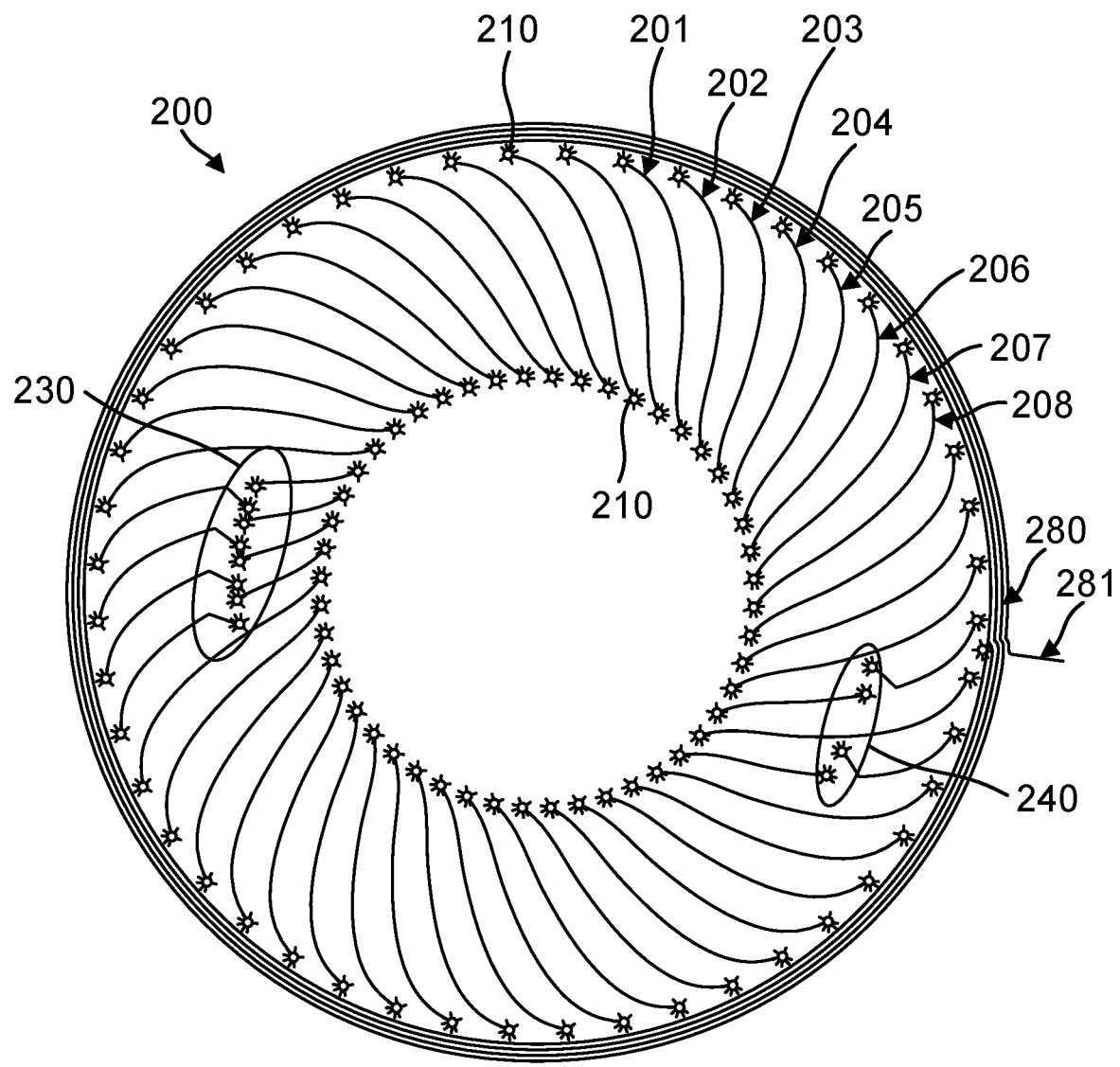
FIG. 2A illustrates an example coil layout for a top layer of a dual receive coil in accordance with some embodiments of the present disclosure.
Figure 2B:
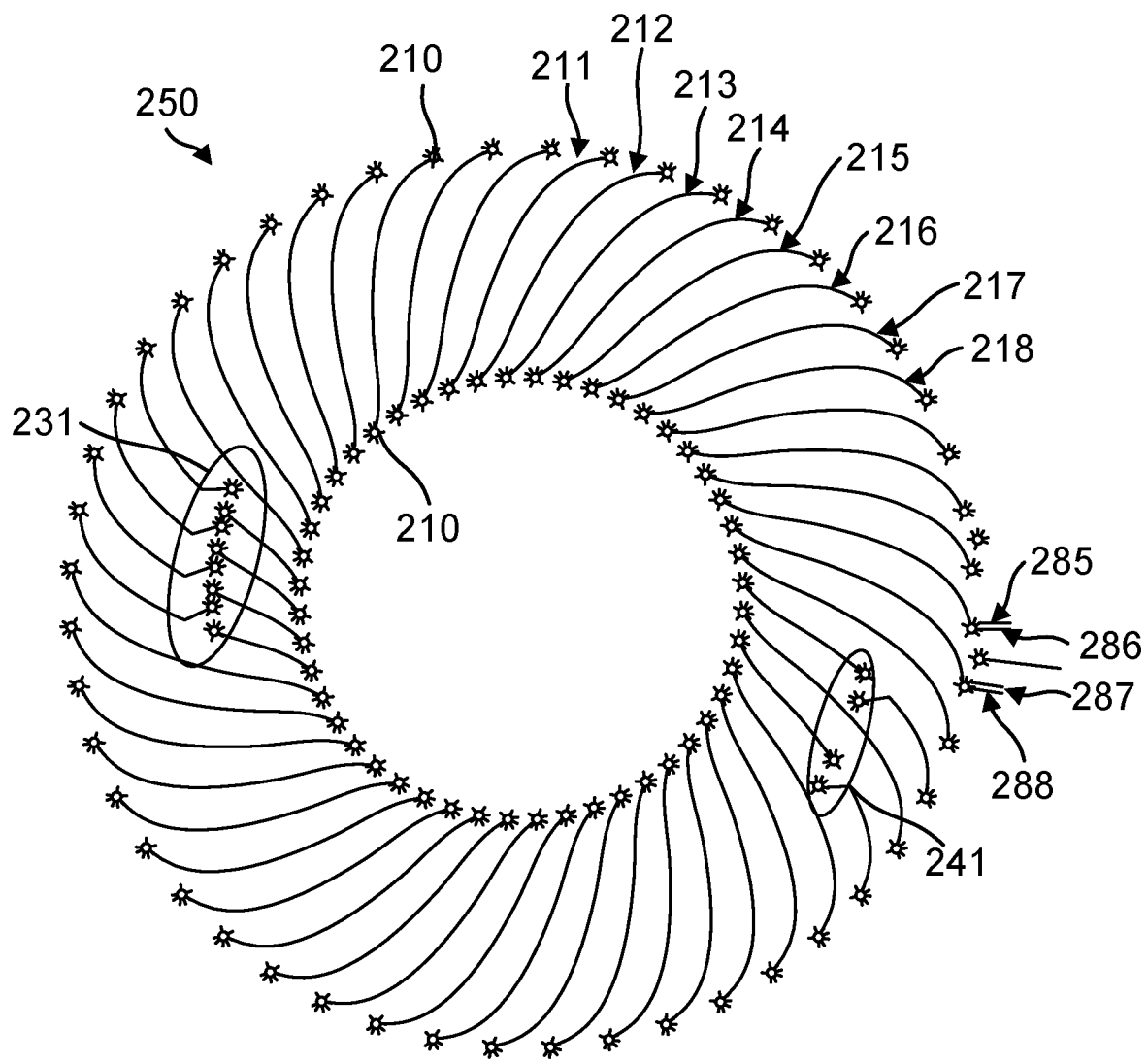
FIG. 2B illustrates an example coil layout for a bottom layer of a dual receive coil in accordance with some embodiments of the present disclosure.

For further explanation, FIG. 2A illustrates a coil layout 200 for a top layer of a dual coil pattern for two receive coils corresponding to distinct signal patterns (e.g., sine and cosine) and FIG. 2B illustrates a coil layout 250 for a bottom layer of a dual coil pattern for two receive coils corresponding to the distinct signal patterns, in accordance with some embodiments of the present disclosure. For example, the coil layout 200 may be disposed on a top layer of a PCB and coil layout 250 may be disposed on a bottom layer of the PCB. The coil layout 200 includes a transmit signal input line 281 and a transmit coil 280 that loops around a dual receive coil layout described below. In the example of FIGS. 2A and 2B, interconnect vias for crossovers between positive and negative windings and between phase windings are formed in the sensing area at natural crossing points (i.e., where the current in the signal reverses).

In FIG. 2A, the coil layout 200 includes a first receive signal coil pattern that is angularly arrayed and a second receive coil that is also angularly arrayed, where the first receive coil and the second receive signal coil pattern are themselves angularly arrayed with respect to each other. The coil layout 200 includes sets of trace segments that correspond to portions of sinusoidal patterns. In the example of FIG. 2A, trace segment 201 corresponds to a portion of a first sinusoidal pattern (e.g., sine) of the first signal, trace segment 203 corresponds to a portion of a first sinusoidal pattern (e.g., cosine) of the second signal, trace segment 202 corresponds to a portion of a second sinusoidal pattern (e.g., phase-shifted sine) of the first signal that is phase-shifted with respect to the first sinusoidal pattern of the first signal, and trace segment 204 corresponds to a portion of a second sinusoidal pattern (e.g., phase-shifted cosine) of the second signal that is phase-shifted with respect to the first sinusoidal pattern of the second signal. The adjacent set of trace segments 205, 206, 207, 208 follow a reverse direction of the signal patterns respectively corresponding to trace segments 201, 202, 203, 204. Forward direction sets of trace segments 201, 202, 203, 204 alternate with reverse direction sets of trace segments 205, 206, 207, 208 around the sensor in that in that each sinusoidal pattern loops around the sensor before reversing direction to form a reflection of the forward direction pattern. Each sinusoidal pattern reverses direction at a natural junction point (e.g., where the current in the signal reverses). In the example, of FIG. 2A, the sinusoidal patterns (e.g., sine, cosine, phase-shifted sine, phase-shift cosine) reverse direction at via pairs 230. Similarly, initial signal patterns (e.g., sine and cosine) transition to phase-shifted signal patterns (e.g., phase-shift sine and phase-shifted cosine) at via pairs 240.

Trace segments in the coil layout 200 of FIG. 2A connect to trace segments in the coil layout 250 of FIG. 2B through vias 210 between the top layer in FIG. 2A and the bottom layer in FIG. 2B. To minimize crossovers between signals and phases of signals, trace segments corresponding to portions of the sinusoidal pattern with increasing amplitude are disposed on one layer and trace segments corresponding to portions of the sinusoidal pattern with decreasing amplitude are disposed on a different layer, with pass through vias connecting the increasing portions to the decreasing portions. For example, trace segments 201, 202, 203, 204 in FIG. 2A connect to trace segments 211, 212, 213, 214 in FIG. 2B and trace segments 205, 206, 207, 208 in FIG. 2A connect to trace segments 215, 216, 217, 218 in FIG. 2B.

In the example coil layout 250 of FIG. 2B, like the example coil layout 200 of FIG. 2A, trace segment 211 corresponds to a portion of a first sinusoidal pattern (e.g., sine) of the first signal, trace segment 213 corresponds to a portion of a first sinusoidal pattern (e.g., cosine) of the second signal, trace segment 212 corresponds to a portion of a second sinusoidal pattern (e.g., phase-shifted sine) of the first signal that is phase-shifted with respect to the first sinusoidal pattern of the first signal, and trace segment 214 corresponds to a portion of a second sinusoidal pattern (e.g., phase-shifted cosine) of the second signal that is phase-shifted with respect to the first sinusoidal pattern of the second signal. The adjacent set of trace segments 215, 216, 217, 218 follow a reverse direction of the signal patterns respectively corresponding to trace segments 211, 212, 213, 214. Forward direction sets of trace segments 211, 212, 213, 214 alternate with reverse direction sets of trace segments 215, 216, 217, 218 around the sensor in that in that each sinusoidal pattern loops around the sensor before reversing direction to form a reflection of the forward direction pattern. Each sinusoidal pattern reverses direction at a natural junction point (e.g., zero amplitude). In the example, of FIG. 2B, the sinusoidal patterns (e.g., sine, cosine, phase-shifted sine, phase-shift cosine) reverse direction at via pairs 231. Similarly, initial signal patterns (e.g., sine and cosine) transition to phase-shifted signal patterns (e.g., phase-shift sine and phase-shifted cosine) at via pairs 241.

In the example of FIG. 2B, the coil layout 250 also includes the input and output lines 285, 286 for the first receive coil, the input and output lines 287, 288 for the second receive coil, and the output line for the transmit coil 280. When superimposed, trace segments in coil layout 200 of FIG. 2A and trace segments in coil layout 250 in FIG. 2B form four sinusoidal patterns that loop around the sensor for a two-signal sense element. In such a configuration, two phases of each signal are blended to improve the signal to noise ratio (SNR). The arctan of the sine and cosine receive signals may be calculated to determine the position of a target over the sense element.

In the example of FIGS. 2A and 2B, the interconnect vias 230, 231, 240, 241 for crossovers between positive and negative windings and between phase windings are placed in the sensing area at natural junction points. However, this can cause non-linearities in output. That is, these interconnects take up space within the intended area that measures the magnetic flux generated by the transmit coil, which can disrupt the intended output. In accordance with embodiments of the present disclosure, signal output is improved by placing interconnects for phase windings and interconnects for positive and negative windings outside of the intended sensing area.

Figure 3A:
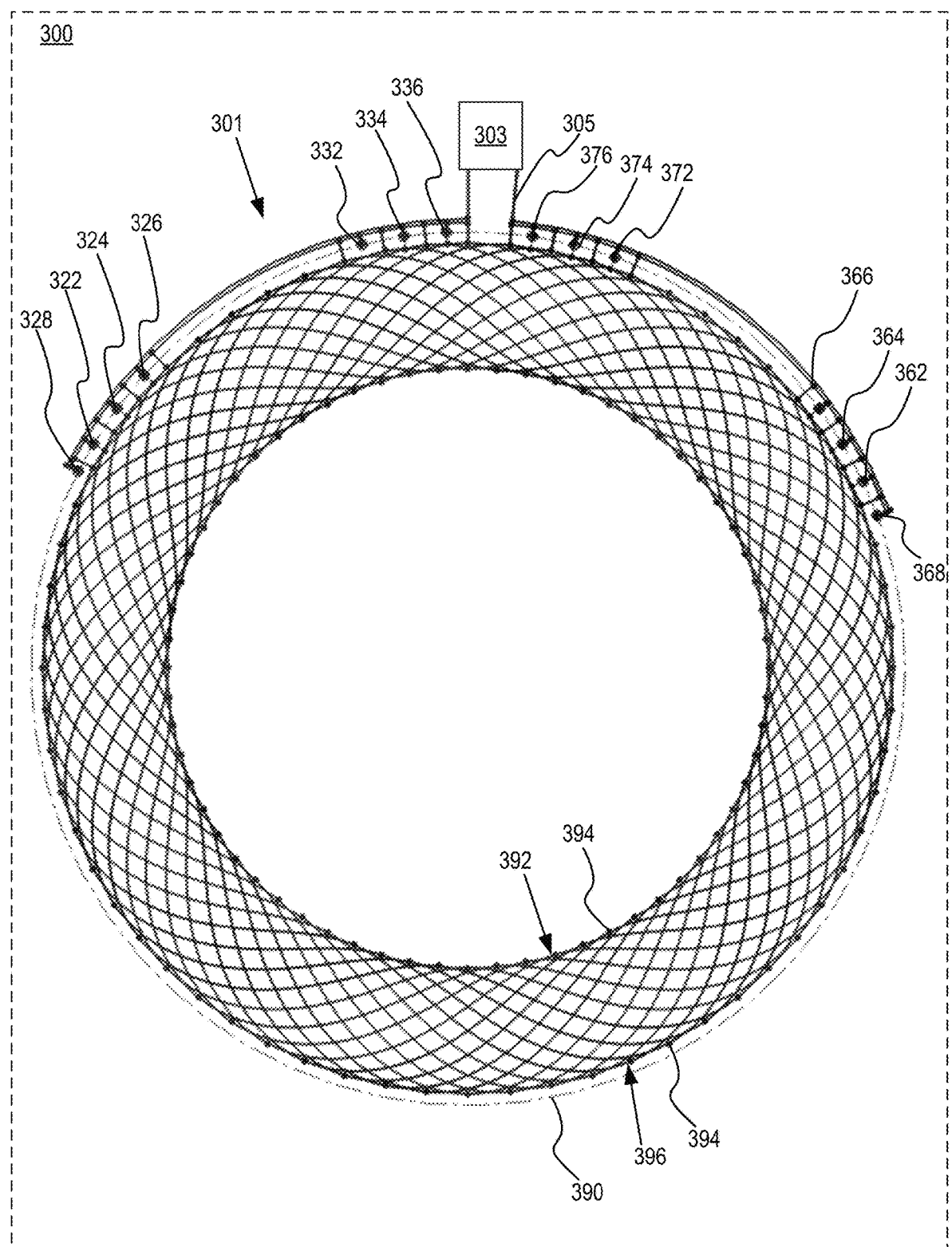
FIG. 3A sets forth an example coil layout in which interconnects are placed outside of the intended sensing area in accordance with some embodiments of the present disclosure.
Figure 3B:
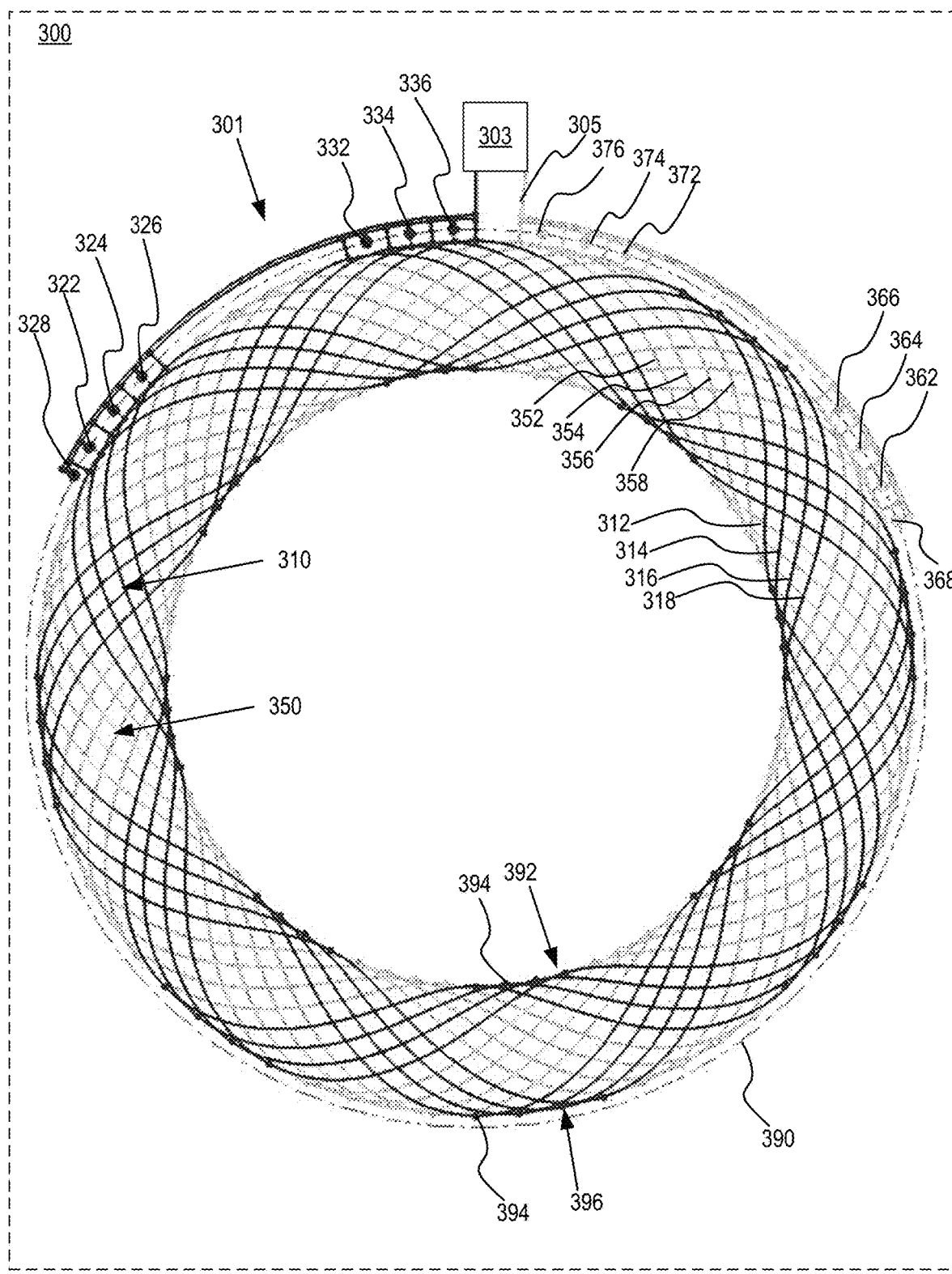
FIG. 3B sets forth another view of the example coil layout shown in FIG. 3A in accordance with some embodiments of the present disclosure.

FIGS. 3A and 3B set forth an example coil layout 300 of an example inductive sense element 301 in which interconnects for positive and negative windings and interconnects for phase windings are placed outside of the intended sensing area. The example coil layout 300 in the example of FIGS. 3A and 3B includes a first receive coil 310, corresponding to a first signal (e.g., sine), having four angularly arrayed loops 312, 314, 316, 318. Of the four angularly arrayed loops 312, 314, 316, 318, one loop propagates the original signal (e.g., sine) while the other three loops each propagate a phase-shifted signal of the original signal. The angularly arrayed loops 312, 314, 316, 318 create a phase-blended signal that improves the SNR of the signal. The example coil layout 300 in the example of FIGS. 3A and 3B also includes a second receive coil 350, corresponding to a second signal (e.g., cosine), having four angularly arrayed loops 352, 354, 356, 358. Of the four angularly arrayed loops 352, 354, 356, 358, one loop propagates the original signal (e.g., cosine) while the other three loops each propagate a phase-shifted signal of the original signal. The angularly arrayed loops 352, 354, 356, 358 create a phase-blended signal that improves the SNR of the signal. In some examples, the arctan of the sine and cosine receive signals in the receive coils 310, 350 may be calculated to determine the position of a target (not shown) over the example sense element 301. In various examples, the sense element 301 is implemented in a PCB, a multilayer PCB, or a printed PCB film utilizing conductive ink. Although two receive coils 310, 350 are depicted in FIGS. 3A and 3B, a coil layout in accordance with embodiments of the present disclosure may include more or fewer receive coils corresponding to distinct signals. In FIGS. 3A and 3B, each receive coil 310, 350 includes an input/output terminal 305, where the input/output terminals 305 each include a trace for a signal input and a trace for a signal output for each receive coil 310, 350. Further, the coil layout 300 includes one or more transmit coils 390. In some examples, the coil layout 300 is coupled to an integrated circuit 303 through input/output traces 305, where the integrated circuit 303 drives a transmission signal to the transmit coil 390, detects a first reference signal in the first receive coil 310 and a second reference signal in the second receive coil 350, and determines a position of a conductive target (not shown) in proximity of the sense element 301 based on a change in the first reference signal and the second reference signal.

In some examples, the receive coils 310, 350 are implemented by multiple planes or layers of trace segments that form sinusoidal patterns, such as discussed above with reference to FIGS. 2A and 2B. For example, the receive coils 310, 350 may be implemented on two or more layers of multilayer PCB, or on opposite sides of a PCB (e.g., a top surface and a bottom surface of a PCB). However, as shown in FIGS. 3A and 3B, these layers are superimposed to illustrate the entirety of the receive coils 310, 350. In some examples, the one or more transmit coils 390 are disposed on PCB layers or surfaces that include one or more layers of the receive coils 310, 350. In other examples, the one or more transmit coils 390 are disposed on separate layers with respect to the receive coils 310, 350. As with the inductive sense element described with reference to FIGS. 2A and 2B, the coil layout 300 may be implemented sinusoidal trace elements on multiple planes, such that a sinusoidal pattern is created as a signal propagates from a trace element on one plane to a trace element on another, where each plane may be a layer of a PCB. Crossovers between planes may be implemented by an inner ring 392 of through vias 394 and an outer ring 396 of through vias 394 that terminate each trace segment. Forward direction sets of trace segments on a particular layer may alternate with reverse direction sets of trace segments around the sense element in that each sinusoidal pattern loops around the sense element before reversing direction to form a reflection of the forward direction pattern. Further, trace segments for the first receive coil 310 may alternate with trace segments of the second receive coil 350. To minimize crossovers between signals and phases of signals, trace segments corresponding to portions of the sinusoidal pattern with increasing amplitude may be disposed on one layer and trace segments corresponding to portions of the sinusoidal pattern with decreasing amplitude are disposed on a different layer, with pass through vias connecting the increasing portions to the decreasing portions.

In the example of FIGS. 3A and 3B, the angularly arrayed loops 312, 314, 316, 318 of the first receive coil 310 are connected in series, where the first receive coil 310 includes positive and negative windings of the angularly arrayed loops 312, 314, 316, 318 such that the angularly arrayed loops 312, 314, 316, 318 create reflective sinusoidal patterns. An input signal enters a receive coil at an input terminal and propagates around the sense element through a first phase loop before transitioning to the next phase loop, and so on, until the signal propagates from the positive winding to the negative winding of the phase loops, and so on, until the phase-blended signal reaches an output terminal. The first receive coil 310 includes positive winding phase interconnects 322, 324, 326 through which the signal crosses over from one phase loop of the positive winding to the next phase loop. The first receive coil 310 also includes negative winding phase interconnects 332, 334, 336 through which the signal crosses over from one phase loop of the negative winding to the next phase loop. A connection trace (not shown here) connects the positive winding of the first receive coil 310 to the negative winding. An input interconnect 328 passes the input signal to the initial loop of the angularly arrayed loops 312, 314, 316, 318. The interconnects 322, 324, 326, and interconnects 332, 334, 336 are disposed outside of an intended sensing area 380, which is illustrated in FIG. 3C.

In the example of FIGS. 3A and 3B, the angularly arrayed loops 352, 354, 356, 358 of the second receive coil 350 are connected in series, where the second receive coil 350 includes positive and negative windings of the angularly arrayed loops 352, 354, 356, 358 such that the angularly arrayed loops 352, 354, 356, 358 create reflective sinusoidal patterns. An input signal enters a receive coil at an input terminal and propagates around the sense element through a first phase loop before transitioning to the next phase loop, and so on, until the signal propagates from the positive winding to the negative winding of the phase loops, and so on, until the phase-blended signal reaches an output terminal. The second receive coil 350 includes positive winding phase interconnects 362, 364, 366 through which the signal crosses over from one phase loop of the positive winding to the next phase loop. The second receive coil 350 also includes negative winding phase interconnects 372, 374, 376 through which the signal crosses over from one phase loop of the negative winding to the next phase loop. A connection trace (not shown here) connects the positive winding of the second receive coil 350 to the negative winding. An input interconnect 368 passes the input signal to the initial loop of the angularly arrayed loops 352, 354, 356, 358. The interconnects 322, 324, 326, and interconnects 332, 334, 336 are disposed outside of an intended sensing area 380, which is illustrated in FIG. 3C.

Figure 3C:
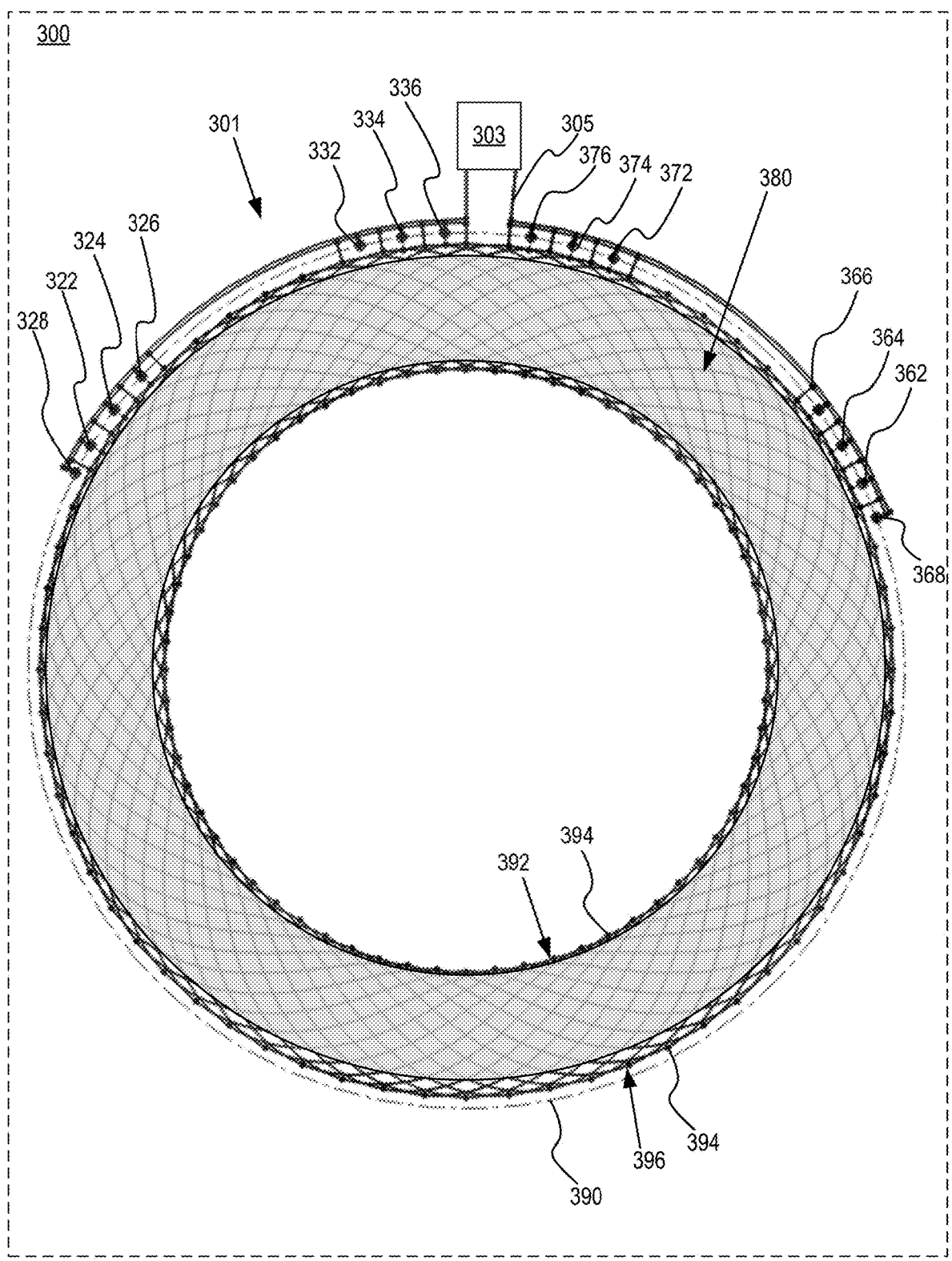
FIG. 3C sets forth another view of the example coil layout shown in FIG. 3A including the intended sensing area in accordance with some embodiments of the present disclosure.

FIG. 3C depicts the coil layout 300 of FIGS. 3A and 3B including the intended sensing area 380. FIG. 3C further identifies a portion 400 of the coil layout 300 that is described in more detail below with respect to FIGS. 4A, 4B, and 4C.

Figure 4A:
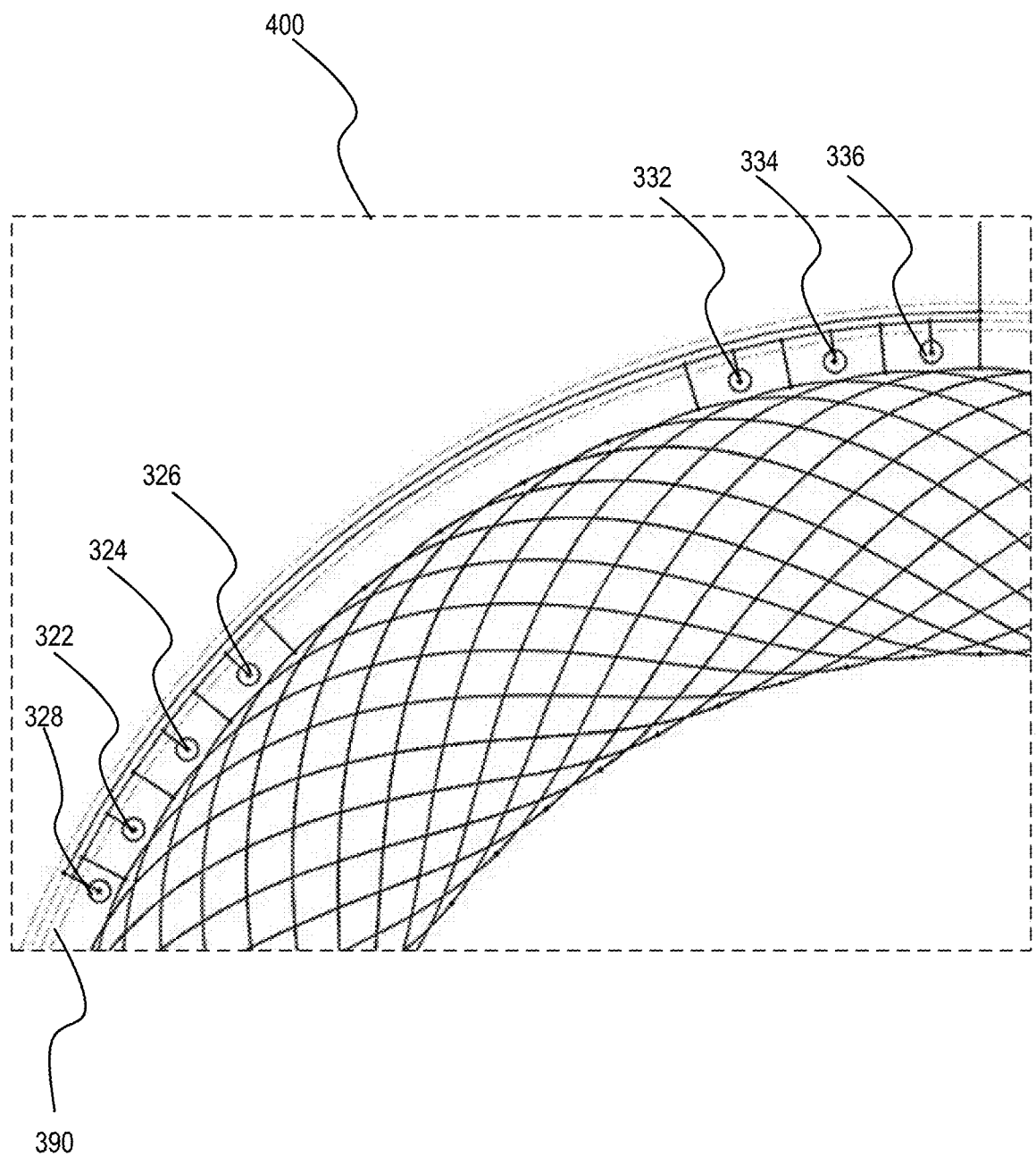
FIG. 4A sets forth a detail view of a portion of the example coil layout shown in FIG. 3A in accordance with some embodiments of the present disclosure.

FIG. 4A depicts a magnified view of the portion 400 of the coil layout 300 identified in FIG. 3C. As can be seen in greater detail, FIG. 4A depicts positive-winding phase interconnects 322, 324, 326 through which the first receive signal crosses over from one phase loop to the next along the positive winding, as well as negative-winding interconnects 332, 334, 336 through which the first receive signal crosses over from one phase loop to the next in the along the negative winding. For example, the original receive signal may be introduced to a first loop 312 of the first receive coil 310, where the receive signal propagates around the coil layout to a first positive-winding phase interconnect 322, where the signal crosses over to a phase-shifted loop 314. The receive signal then propagates around the loop 314 of the coil layout 300 to a second positive-winding phase interconnect 324, where the signal crosses over to a next phase-shifted loop 316. The receive signal then propagates along the loop 316 around the coil layout 300 to a third positive-winding phase interconnect 326, where the signal crosses over to yet another phase-shifted loop 318. The receive signal then propagates along the loop 318 around the coil layout 300 until the signal transitions to the negative-winding of the first receive coil 310. The process repeats, with the signal transitioning between phase loops at negative-winding phase interconnects 332, 334, 336. When the signal completes the last loop 358 of the negative winding, the signal reaches the output terminal of the receive coil 310. The transmit coil 390 is also shown in FIG. 4A. As described above, the portion 400 includes multiple superimposed layers of the coil layout 300.

Figure 4B:
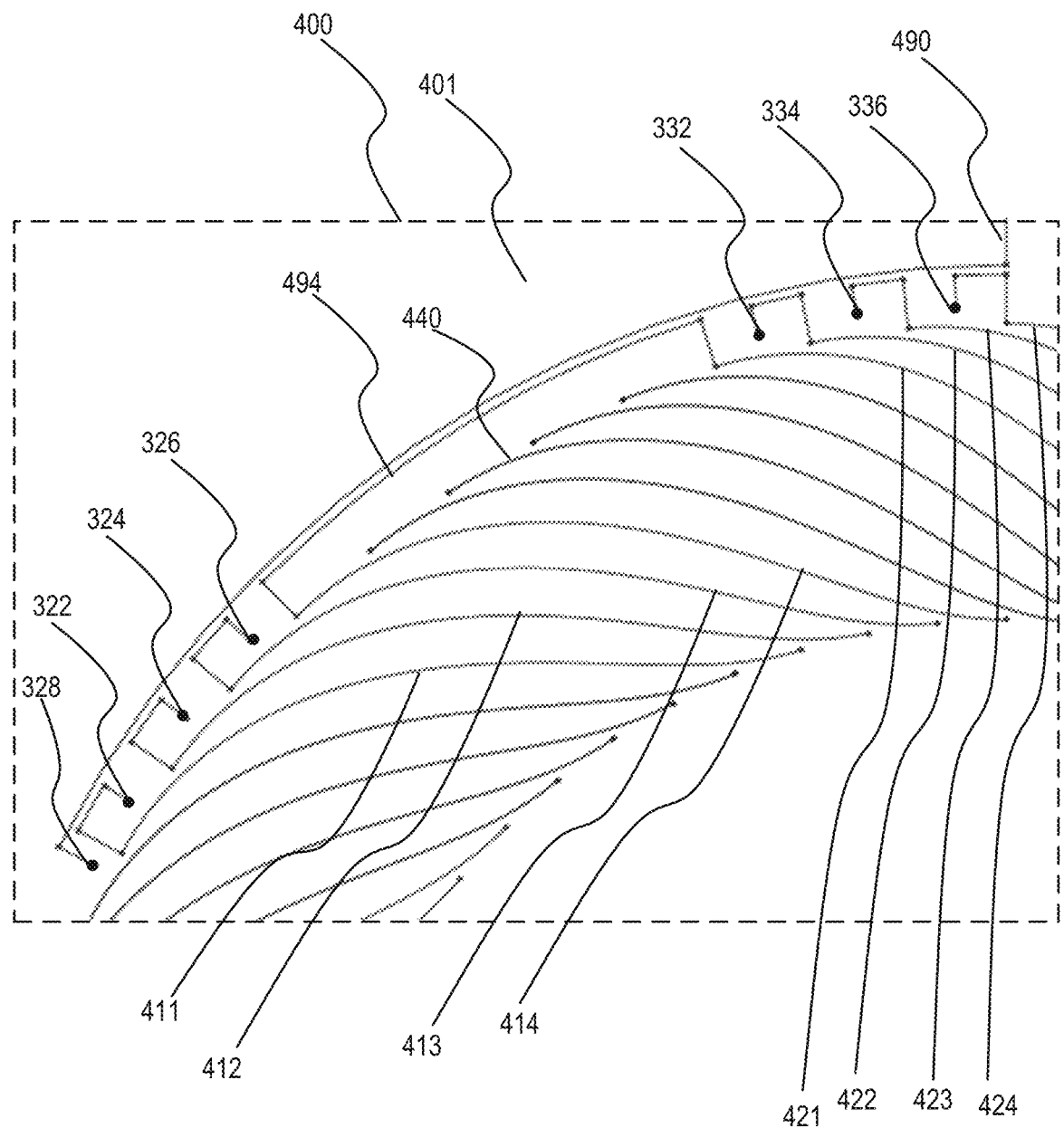
FIG. 4B sets forth a first layer of the portion of the example coil layout shown in FIG. 4A in accordance with some embodiments of the present disclosure.
Figure 4C:
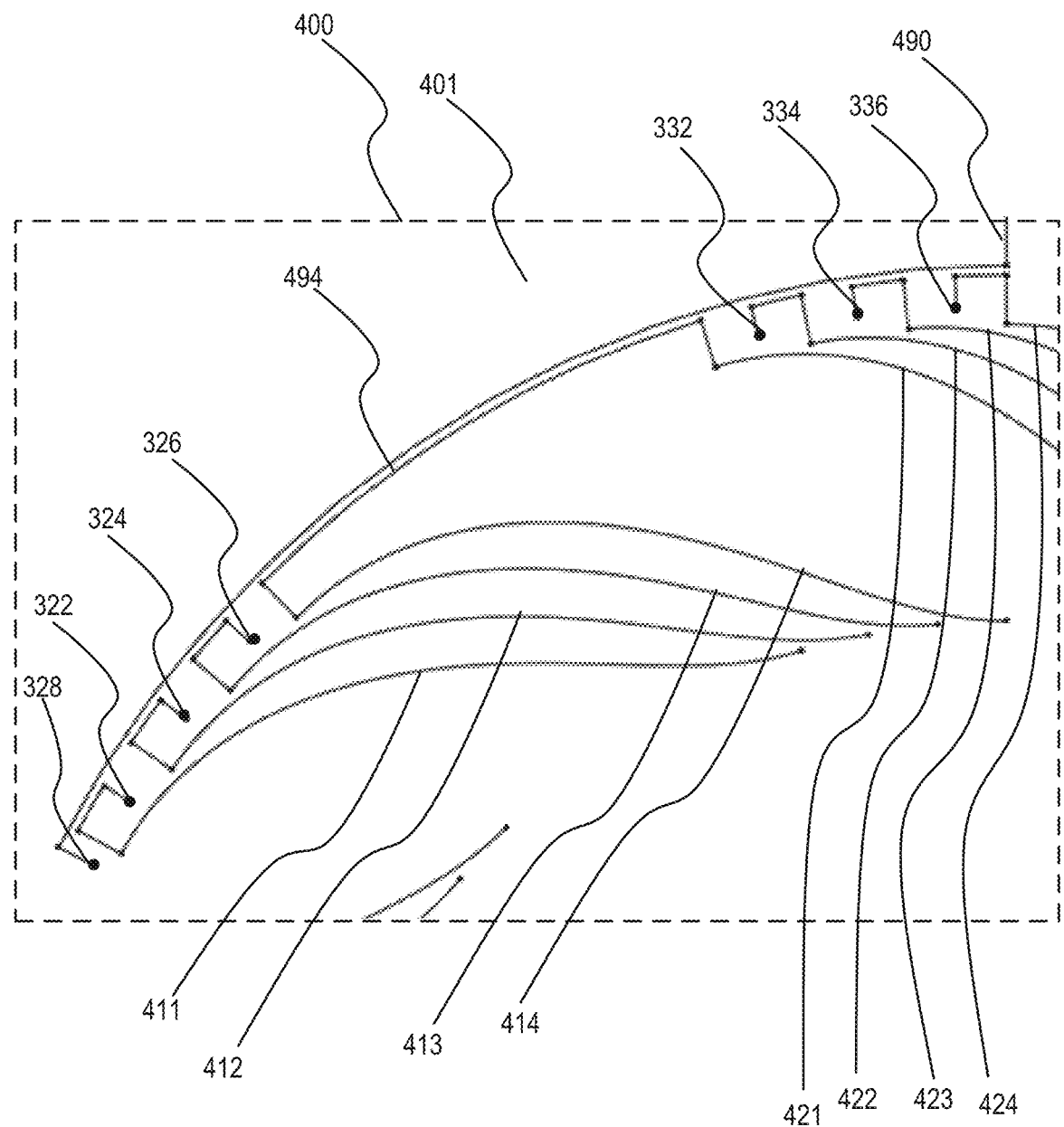
FIG. 4C sets forth another view of the first layer shown in FIG. 4B.

For further explanation, FIG. 4B depicts a first receive coil PCB layer 401 of the coil layout 300 for the example sense element 301, where the first receive coil PCB layer 401 corresponds to the portion 400. The first receive coil PCB layer 401 includes a first positive-winding trace segment 411 of the first loop 312 of the first receive coil 310, a second positive-winding trace segment 412 of the second loop 314 (phase-shifted) of the first receive coil 310, a third positive-winding trace segment 413 of the third loop 316 (phase-shifted) of the first receive coil 310, and a fourth positive-winding trace segment 414 of the fourth loop 318 (phase-shifted) of the first receive coil 310. The positive-winding trace segments 412, 413, 414 are respectively coupled to positive-winding phase interconnects 322, 324, 326 placed outside the intended sensing area that allow the receive signal to propagate from one phase loop to the next. The first receive coil PCB layer 401 also includes a first negative-winding trace segment 421 of the first loop of the first receive coil 310, a second negative-winding trace segment 422 of the second loop (phase-shifted) of the first receive coil 310, a third negative-winding trace segment 423 of the third loop (phase-shifted) of the first receive coil 310, and a fourth negative-winding trace segment 424 of the fourth loop (phase-shifted) of the first receive coil 310. Negative-winding trace segments 421, 422, 423 are respectively coupled to negative-winding phase interconnects 332, 334, 336 placed outside the intended sensing area that allow the receive signal to propagate from one phase loop to the next. An input line 490 is coupled to an input interconnect 328. A positive-to-negative trace segment 494 connects the fourth positive-winding trace segment 414 to the first negative-winding trace segment 421. The first receive coil PCB layer 401 also includes second signal trace segments 440 that are not coupled to the interconnects shown in FIG. 4B. Vias 394 allow the first receive signal to pass from traces in the first receive coil PCB layer 401 to traces in the second receive coil PCB layer 402. FIG. 4C depicts the first receive coil PCB layer 401 of FIG. 4B, except with the trace segments of the second receive coil removed for clarity.

Figure 4D:
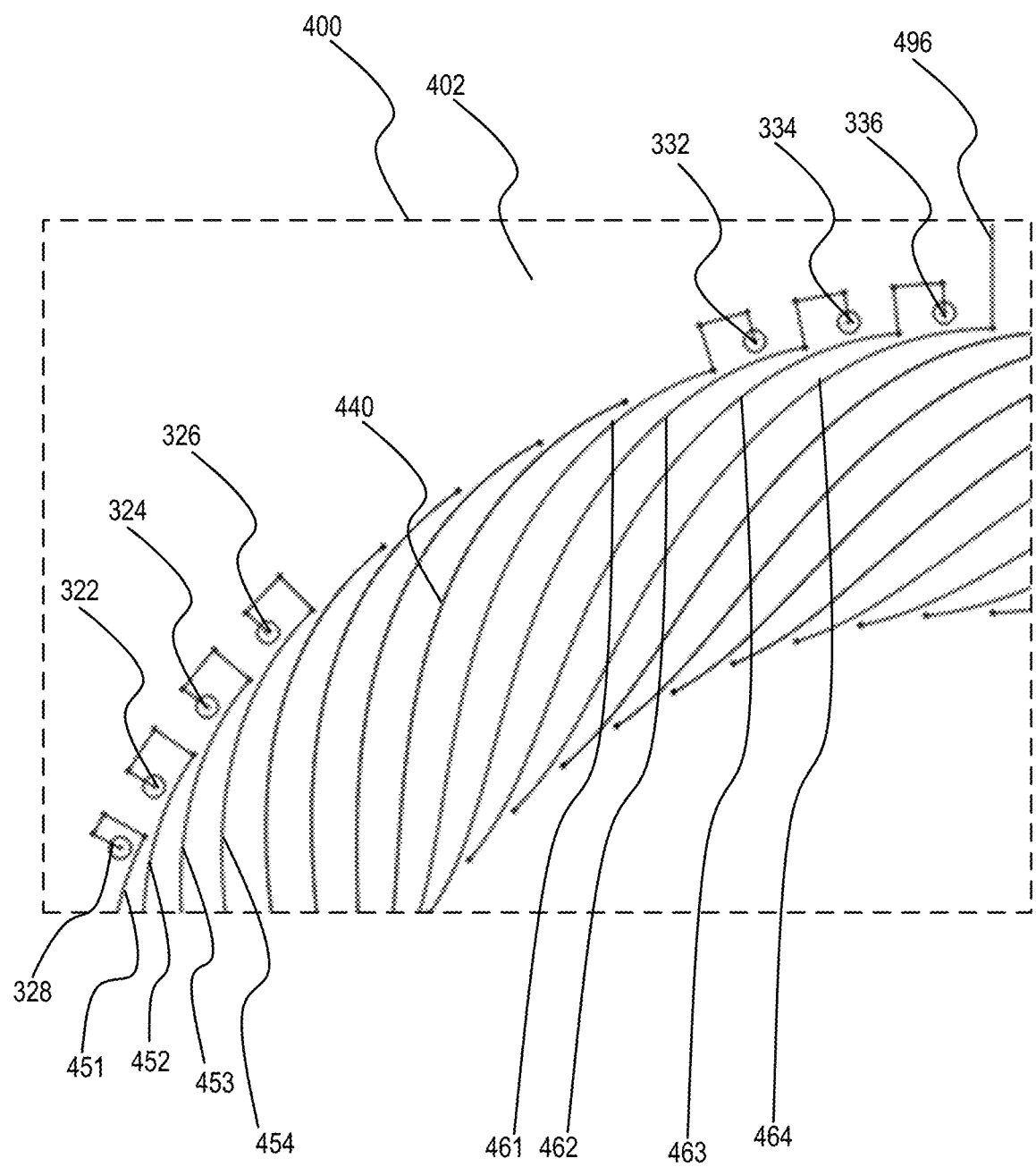
FIG. 4D sets forth a second layer of the portion of the example coil layout shown in FIG. 4A in accordance with some embodiments of the present disclosure.
Figure 4E:
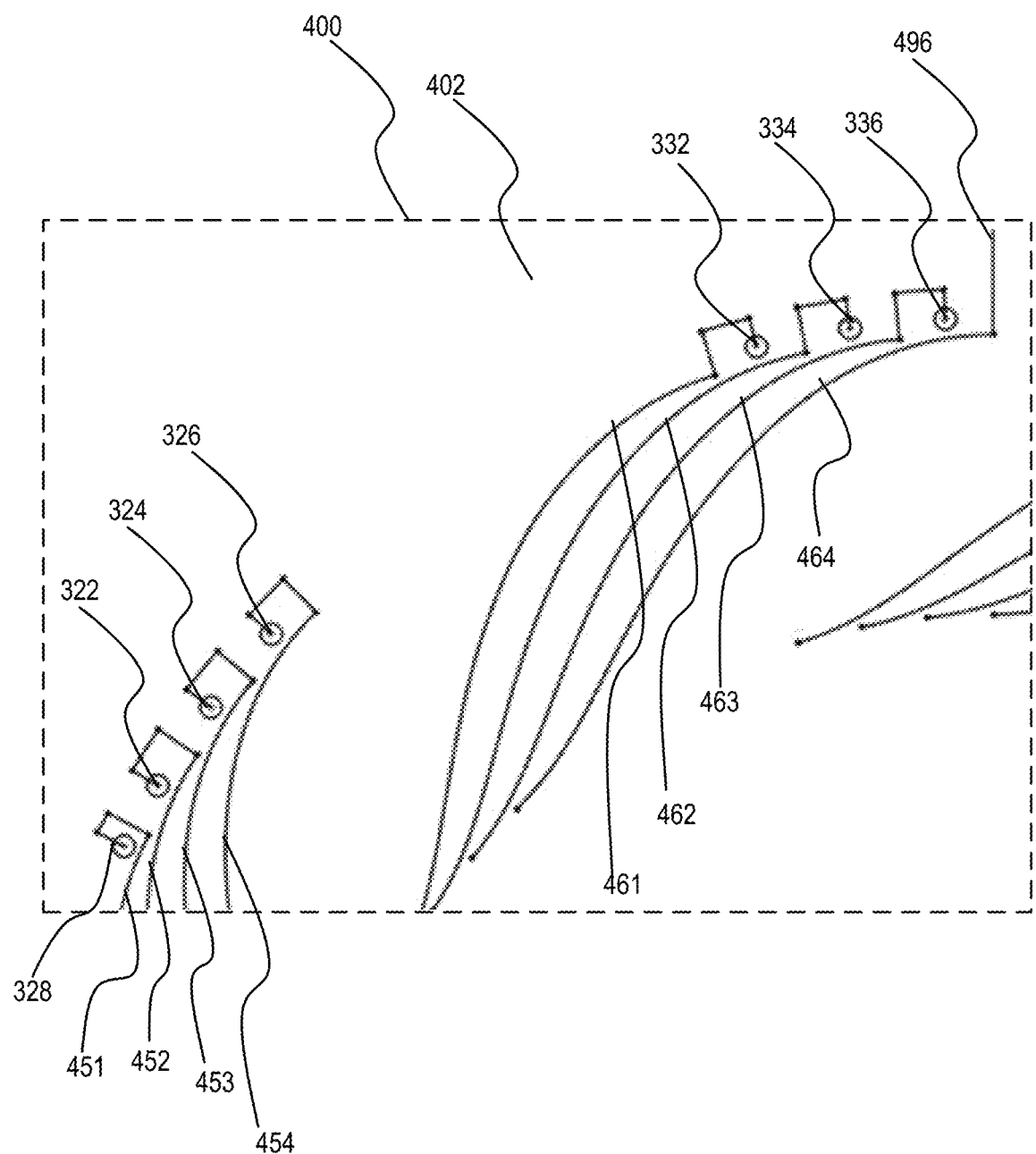
FIG. 4E sets forth another view of the second layer shown in FIG. 4D.

For further explanation, FIG. 4D depicts a second receive coil PCB layer 402 of the coil layout 300 for the example sense element 301, where the second receive coil PCB layer 402 corresponds to the portion 400. The second receive coil PCB layer 402 includes a first positive-winding trace segment 451 of the first loop 312 of the first receive coil 310, a second positive-winding trace segment 452 of the second loop 314 (phase-shifted) of the first receive coil 310, a third positive-winding trace segment 453 of the third loop 316 (phase-shifted) of the first receive coil 310, and a fourth positive-winding trace segment 454 of the fourth loop 318 (phase-shifted) of the first receive coil 310. The positive-winding trace segments 452, 453, 454 are respectively coupled to positive-winding phase interconnects 322, 324, 326 that allow the receive signal to propagate from one phase loop to the next. The second receive coil PCB layer 402 also includes a first negative-winding trace segment 461 of the first loop of the first receive coil 310, a second negative-winding trace segment 462 of the second loop (phase-shifted) of the first receive coil 310, a third negative-winding trace segment 463 of the third loop (phase-shifted) of the first receive coil 310, and a fourth negative-winding trace segment 464 of the fourth loop (phase-shifted) of the first receive coil 310. Negative-winding trace segments 461, 462, 463 are respectively coupled to negative-winding phase interconnects 332, 334, 336. An output line 496 is coupled to fourth negative-winding trace segment 464. The first receive coil PCB layer 401 also includes second signal trace segments 440 that are not coupled to the interconnects shown in FIG. 4D. Vias 394 allows the first receive signal to pass from traces in the second receive coil PCB layer 402 to traces in the first receive coil PCB layer 401. FIG. 4E depicts the second receive coil PCB layer 402 of FIG. 4D, except with the trace segments of the second receive coil removed for clarity.

For further explanation, FIG. 5 sets forth a flow chart illustrating an example method for an inductive position sensor in accordance with an embodiment of the present disclosure. The method of FIG. 5 includes providing 510 a sense element comprising at least one transmit coil; a first receive coil that includes a first plurality of arrayed loops, wherein two or more of the first plurality of arrayed loops are phase blended; a first plurality of interconnects, each of the first plurality of interconnects connecting two of the first plurality of arrayed loops, wherein the first plurality of interconnects is disposed outside of a sensing area of the sense element; a second receive coil that includes a second plurality of arrayed loops, wherein two or more of the second plurality of arrayed loops are phase blended; and a second plurality of interconnects, each of the second plurality of interconnects connecting two of the second plurality of arrayed loops, wherein the second plurality of interconnects is disposed outside of the sensing area of the sense element. In some examples, providing 510 the sense element is carried out by providing an inductive position sense element having an arrayed receive coil layout such as the receive coil layout 300 described with reference to FIGS. 3A, 3B, 3C, 4A, 4B, 4C, 4D, and 4E.

The example method of FIG. 5 also includes driving 520 the at least one transmit coil. In some examples, driving 520 the at least one transit coil includes driving the at least one transmit coil with a signal in parallel with a capacitor to generate a magnetic field that is the transmitted signal to the receive coils. In some examples, integrated circuit (e.g., an ASIC) drives the at least one transmit coil.

The example method of FIG. 5 also includes detecting 530 a first reference signal in the first receive coil and detecting 540 a second reference signal in the second receive coil. In some examples, detecting 530 a first reference signal in the first receive coil and detecting 540 a second reference signal in the second receive coil is carried out by an integrated circuit that detects the voltage in the first receive coil and the second receive coil induced by the magnetic field generated by the signal transmitted by the transmit coil.

The example method of FIG. 5 also includes determining 550 a position of a conductive target in proximity of the sense element based on a change in the first reference signal and the second reference signal. In some examples, determining 550 a position of a conductive target in proximity of the sense element based on a change in the first reference signal and the second reference signal is carried out by the integrated circuit determining the action of the first reference signal and the second reference signal. A phase-blended first reference signal of the first receive coil is summed and correlated to the mean position of the coil loops and a phase-blended second reference signal of the second receive coil is summed and correlated to the mean position of the coil loops.

In view of the explanations set forth above, readers will recognize that the benefits the phase blended, arrayed, multiloop inductive coils with layout compensated geometry include increased signal strength on receive coils of an inductive position sensor, providing the purest intended sinusoidal response signal for optimal sensor performance, allowing functionality and maintain signal quality in broad range of form factors and application requirements, and decreased susceptibility to sensor and system variable's tolerance ranges and stacks. By increasing the signal strength in the receive coils, the signal to noise ratio may be increased, thresholds for proper signal conditioning can be met, and sensor sensitivity to target position under all application conditions (e.g., airgap and temperature ranges) can be improved. Placement of the interconnects for the arrayed loops outside of the sensing area reduces disruptions in intended signal generation and reduces non-linearity in output. This also allows a higher density of coil traces to allow for use in smaller applications or to increase coil loops for increased signal strength. As such, the disclosed embodiments provide a combination of improved performance, increased design flexibility, and lower cost.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A sense element for an inductive position sensor, the sense element comprising:

at least one transmit coil;
a first receive coil that includes a first plurality of arrayed loops, wherein two or more of the first plurality of arrayed loops are phase blended; and
a first plurality of interconnects, each of the first plurality of interconnects connecting two of the first plurality of arrayed loops, wherein the first plurality of interconnects is disposed outside of a sensing area of the sense element;
wherein a connector trace between a positive winding of the first receive coil and a negative winding of the first receive coil is disposed outside of the sensing area of the sense element.

2. The sense element of claim 1 further comprising:
a second receive coil that includes a second plurality of arrayed loops, wherein two or more of the second plurality of arrayed loops are phase blended; and
a second plurality of interconnects, each of the second plurality of interconnects connecting two of the second plurality of arrayed loops, wherein the second plurality of interconnects is disposed outside of the sensing area of the sense element.

3. The sense element of claim 1, wherein a particular loop in the first plurality of arrayed loops includes a first trace pattern in a first conductive layer, a second trace pattern in a second conductive layer, and a plurality of vias connecting the first trace pattern and the second trace pattern.

4. The sense element of claim 3, wherein the first conductive layer and the second conductive layer are formed on opposite sides of a printed circuit board.

5. The sense element of claim 3, wherein the first conductive layer and the second conductive layer are formed in different layers of a multilayer printed circuit board.

6. The sense element of claim 1, wherein a particular loop in the first plurality of arrayed loops includes a first trace pattern in a first conductive layer and a second trace pattern in a second conductive layer; and wherein the first conductive layer and the second conductive layer are composed of conductive ink on printed film.

7. The sense element of claim 1, wherein a particular interconnect of the first plurality of interconnects couples a trace segment of a first coil loop on a first layer of the sense element to a trace segment of a phase-shifted coil loop on a second layer of the sense element.

8. An inductive position sensor comprising:
a sense element including:
at least one transmit coil;
two or more receive coils including at least:
a first receive coil that includes a first plurality of arrayed loops, wherein two or more of the first plurality of arrayed loops are phase blended; and
a second receive coil that includes a second plurality of arrayed loops, wherein two or more of the second plurality of arrayed loops are phase blended;
a first plurality of interconnects, each of the first plurality of interconnects connecting two of the first plurality of arrayed loops of the first receive coil, wherein the first plurality of interconnects is disposed outside of a sensing area of the sense element; and
a second plurality of interconnects, each of the second plurality of interconnects connecting two of the second plurality of arrayed loops of the second receive coil, wherein the second plurality of interconnects is disposed outside of the sensing area of the sense element;
wherein a connector trace between a positive winding of the first receive coil and a negative winding of the first receive coil is disposed outside of the sensing area of the sense element; and
an integrated circuit configured to:
provide a transmission signal to the at least one transmit coil;
detect a first reference signal in the first receive coil;
detect a second reference signal in the second receive coil; and
detect a position of a conductive target based on change in the first reference signal and the second reference signal.

9. The inductive position sensor of claim 8, wherein a particular loop in the first plurality of arrayed loops includes a first trace pattern in a first conductive layer, a second trace pattern in a second conductive layer, and a plurality of vias connecting the first trace pattern and the second trace pattern.

10. The inductive position sensor of claim 9, wherein the first conductive layer and the second conductive layer are formed on opposite sides of a printed circuit board.

11. The inductive position sensor of claim 9, wherein the first conductive layer and the second conductive layer are formed in different layers of a multilayer printed circuit board.

12. The inductive position sensor of claim 8, wherein a particular loop in the first plurality of arrayed loops includes a first trace pattern in a first conductive layer and a second trace pattern in a second conductive layer; and wherein the first conductive layer and the second conductive layer are composed of conductive ink on printed film.

13. A method for an inductive position sensor, the method comprising:
providing a sense element comprising:
at least one transmit coil;
two or more receive coils including at least:
a first receive coil that includes a first plurality of arrayed loops, wherein two or more of the first plurality of arrayed loops are phase blended; and
a second receive coil that includes a second plurality of arrayed loops, wherein two or more of the second plurality of arrayed loops are phase blended;
a first plurality of interconnects, each of the first plurality of interconnects connecting two of the first plurality of arrayed loops of the first receive coil, wherein the first plurality of interconnects is disposed outside of a sensing area of the sense element; and
a second plurality of interconnects, each of the second plurality of interconnects connecting two of the second plurality of arrayed loops of the second receive coil, wherein the second plurality of interconnects is disposed outside of the sensing area of the sense element;
wherein a connector trace between a positive winding of the first receive coil and a negative winding of the first receive coil is disposed outside of the sensing area of the sense element;
detecting, by an integrated circuit, a first reference signal in the first receive coil;
detecting, by the integrated circuit, a second reference signal in the second receive coil; and determining, by the integrated circuit, a position of a conductive target in proximity of the sense element based on a change in the first reference signal and the second reference signal.

14. The method of claim 13, wherein a particular loop in the first plurality of arrayed loops includes a first trace pattern in a first conductive layer, a second trace pattern in a second conductive layer, and a plurality of vias connecting the first trace pattern and the second trace pattern.

15. The method of claim 14, wherein the first conductive layer and the second conductive layer are formed on opposite sides of a printed circuit board.

16. The method of claim 14, wherein the first conductive layer and the second conductive layer are formed in different layers of a multilayer printed circuit board.

17. The method of claim 13, wherein a particular interconnect of the first plurality of interconnects couples a trace segment of a first coil loop on a first layer of the sense element to a trace segment of a phase-shifted coil loop on a second layer of the sense element.

* * * * *